S. MARSH.
Grain Drier.
No. 42,957.   Patented May 31, 1864.
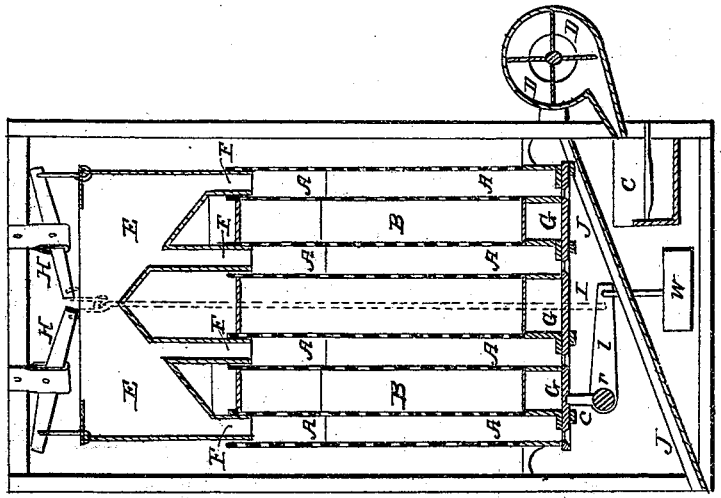
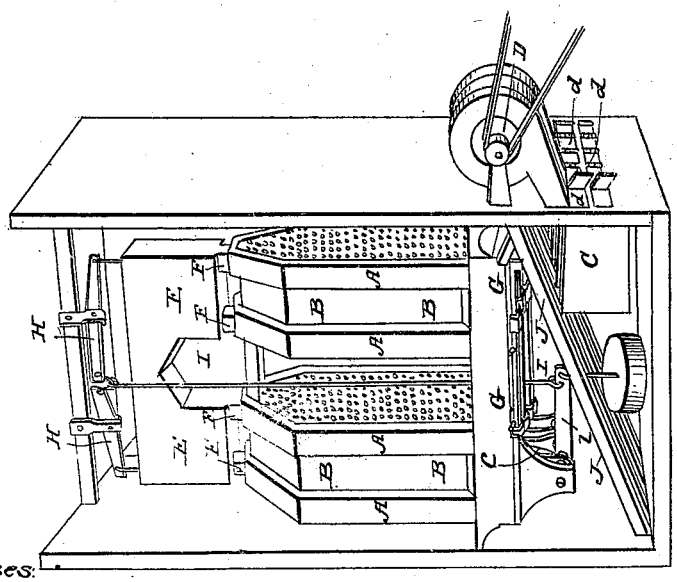

UNITED STATES PATENT OFFICE.

SYLVESTER MARSH, OF CHICAGO, ILLINOIS.

IMPROVEMENT IN GRAIN-DRIERS.

Specification forming part of Letters Patent No. 42,957, dated May 31, 1864.

*To all whom it may concern:*

Be it known that I, SYLVESTER MARSH, of Chicago, in the county of Cook and State of Illinois, have invented certain new and useful Improvements in Drying Grain and in Apparatus Used for that Purpose; and I hereby declare that the following is a full, clear, and exact description of the same, reference being had to the accompanying drawings, in which—

Figure 1 is a perspective view, and Fig. 2 a sectional elevation, of an apparatus constructed in accordance with this my invention.

It is well known that when cereals are stored up in large quantities the center of the mass is unventilated, and rapidly deteriorates in value until, in the course of time, it becomes utterly worthless. The chemical constituents of the grain change their character, undergoing fermentation, and from thence molding, so that the produce is valueless. This fact is also observable in flour. When closely packed for a long time, it becomes musty and sour, and barrels of a peculiar kind have been invented to guard against this evil.

I have endeavored by numerous experiments to ascertain the best means of obviating the loss attendant upon the storing of grain, and I have found that cereals may be preserved in comparatively large masses if they be deprived of the moisture which all grains contain in more or less considerable quantities. This has heretofore been practiced with but partial success, owing to the complicated nature of the apparatus or some defect in the arrangement or principle of operation.

Letters Patent of the United States were issued to me for a method of and apparatus for drying grain which answered the purpose well; but in two particulars there was room for improvement. First, the grain being spread on a horizontal table, extended works or apparatus are required to dry large quantities of grain, which in cities, where the grain trade is located and where ground is expensive, is costly; second, the grain while being dried, being necessarily kept in motion, required a large outlay in manual labor or stirring machinery.

The objects of the present invention, therefore, are, first, the construction of an apparatus which, while allowing of any amount of grain being dried, shall occupy but little horizontal space; second, the dispensing with manual labor or stirring machinery for feeding and moving the mass of grain while undergoing the drying process. I have accomplished these by forming a drying apparatus of upright chambers with perforated sides, and having hot-air flues interposed, and by combining with such chambers a grain-feeding mechanism, regulating automatically both the flow of the dried grain and the passage of the heated air through the mass.

In the accompanying drawings, A are the grain-chambers. They are upright and flat receptacles, composed of perforated metallic side walls, closed in front and rear, and their upper part being contracted terminating in an opening, within which the hopper-spout F has an up-and-down play. On the under side these chambers are provided with a slide, G, closing or opening the outlet through which the grain is discharged. These air-chambers are arranged in pairs, of which there may be one or more in one brick inclosure. In this instance there are two pairs. Between the two chambers, constituting a pair, there is a hot-air flue, B, open at the bottom and closed at the top, so that the hot air which is blown or forced into this flue has no other exit than the grain-chamber, which it enters through the perforations of the side wall. These grain-chambers and flues are supported by means of girders or beams within the inclosure and over inclined chutes or troughs J, arranged directly underneath the discharge-openings of the chambers.

C is the furnace, consisting of a grate of fire-bars supported over an ash-pit, and doors $d\ d'$ are arranged in the inclosure, the former for charging the furnace with fuel and the latter for removing the ashes. Over the fire-bars there is arranged, on the outside of the inclosure, a fan, D, driven by any suitable motive power—say a steam-engine. By this means air is forced over the fire, which, becoming heated, enters the flues and enters the grain-chambers. The slides G are operated by cranks $c$, mounted upon a rocking shaft, $r$, which is operated by means of a scale mechanism consisting of a weighted lever, $l$, and suspension-rod I, coupling a pair of balance-beams, H H'. The latter are hung in their centers, their inner ends being coupled with the rod I, while their outer end is connected with the hopper E. The weight $w$, operating the slides, is calculated to exceed the weight of the hopper when empty or but partly filled; but if the hopper is full its weight overcomes that of the lever $l$, and causes the rock shaft $r$ to move and to shift and open the slides. In Fig. 2 the slides are shown open, the hopper being supposed to be filled.

The hopper is provided with spouts F, which, as before stated, enter the neck or opening of the grain-chamber.

It will be seen that as the heated air from the furnace C is forced up the flue by the action of the fan D it comes in contact with the grain and deprives it of moisture, and not only this, but as there is no other outlet the air must permeate the whole mass, thus drying every kernel as thoroughly as those on the outside or next the metallic walls of the partition. In order that this shall be perfectly done, the grain-partitions are fitted with a self-acting hopper, E, which works in the following manner: When the grain runs in at the top, it passes down the spouts F into the drying-room or grain-bin. Now, when the hopper is full it falls and opens the slide G at the bottom, through the action of the levers and rods H and I, so that the grain is discharged into the troughs J, at the foot of which, outside the building, are placed bags or other receptacles to contain the grain. By this means the drying-bins are always full. If some self-acting arrangement of this kind were not applied, the heated air would rush out of the holes in the top of the grain-bins and escape; thus the operation would be costly and incomplete.

Having thus described my invention and the manner in which the same is or may be carried into effect, I would observe that I do not wish to be understood as confining myself to the precise arrangement of parts herein described. Many modifications may be applied without departure from the principle of my invention. Thus, instead of using vertical chambers, inclined chambers may be used; instead of having chambers of equal width throughout their heights, they may be made wider or broader on top—i. e., the flues may be contracted toward the top; instead of having an open fire, any other arrangement may be adopted for heating the air forced into the drier, and other modifications may be introduced too lengthy now to enumerate.

I claim—

1. The method of drying grain in upright chambers by causing the grain to travel in a direction contrary to the ascending currents of heated air or gases, the chamber being arranged to expose a large superficial area of grain in thin layers between perforated metallic plates to the action of the heated air, substantially as shown and described.

2. The arrangement of the grain-chambers in pairs, the two chambers having between them a hot-air flue having no other exit than through the chamber described.

3. In combination with the drying-chambers and hot-air flues, arranged as described, the employment of a hopper to supply the grain to the chamber, and a slide-valve to regulate its discharge under such an arrangement as that the same shall be self-acting and regulating the supply and discharge of grain in the manner and for the purposes set forth.

In testimony whereof I have signed my name to this specification before two subscribing witnesses.

SYLVESTER MARSH.

Witnesses:
 A. POLLAK,
 EDM. F. BROWN.